United States Patent [19]

Anagnost et al.

[11] 4,079,356

[45] Mar. 14, 1978

[54] CODED ELECTRONIC LOCK AND KEY

[75] Inventors: Christ W. Anagnost, Dover; Michael A. Carmody, Belvidere, both of N.J.

[73] Assignee: The United States of America as represented by the Secretary of the Army, Washington, D.C.

[21] Appl. No.: 671,805

[22] Filed: Mar. 30, 1976

[51] Int. Cl.² .............................................. H04Q 3/00

[52] U.S. Cl. ............................ 340/149 A; 340/274 C; 340/164 R

[58] Field of Search ....... 340/149 A, 274 C, 147 MD, 340/164 R; 70/277, 278

[56] References Cited

U.S. PATENT DOCUMENTS

| | | | |
|---|---|---|---|
| 3,934,122 | 1/1976 | Riccitelli | 340/149 A |
| 3,944,976 | 3/1976 | France | 340/149 A |
| 3,979,647 | 9/1976 | Perron | 340/274 C |

*Primary Examiner*—Harold I. Pitts
*Attorney, Agent, or Firm*—Nathan Edelberg; A. Victor Erkkila; Thomas R. Webb

[57] ABSTRACT

An electronic key comprises a first binary counter and a first multiplexer for pulse code modulating a uniform clock pulse train to produce a first coded pulse train modulated with a given code. The key is connected to an electronic lock comprising: a second binary counter and a second multiplexer for pulse code modulating the same clock pulse train to produce a second coded pulse train modulated with the same code; an EXCLUSIVE-OR gate to which said first and second multiplexers are connected; a first NAND gate having one input connected to the output of the EXCLUSIVE-OR gate; a flip-flop or a binary counter having its clock input connected to the output of the NAND gate and an inital logical ONE output connected to a second input of the NAND gate; a second NAND gate having one input connected to the output of the flip-flop or counter and another input connected to the output of the second multiplexer; and a binary output counter having its clock input connected to the output of the second NAND gate. The output of the lock is taken from one of the counting outputs of the output counter.

12 Claims, 3 Drawing Figures

CODED ELECTRONIC LOCK AND KEY

GOVERMENTAL INTEREST

The invention described herein may be manufactured, used and licensed by or for the Government for Governmental purposes without the payment to use of any royalties thereon.

BACKGROUND AND SUMMARY OF THE INVENTION

Electronic locks and keys are used in military applications to prevent unauthorized launching of missiles and arming of nuclear warheads, and in commercial applications to prevent unauthorized entrance into a given area or initiation of a process, for examples.

Mechanical locks, such as combination or lock and key types, are inadequate for military purposes since they can easily be opened, cannot be used where initiation or activation from a remote area is required, and can malfunction in extreme environmental conditions of temperature, etc.

Electronic locks and keys using shift registers have been used, but have not been entirely satisfactory from the standpoint of security and volume or space, for examples.

The present invention relates to a new and improved electronic lock, and lock and key combination, in which a large number of design options are available to make it statistically impossible to circumvent the lock with trial and error use of random codes, without the required key.

In accordance with the invention, an electronic key comprising first means for generating a first coded pulse train is connected to an electronic lock comprising: second means for generating a second coded pulse train; an EXCLUSIVE-OR gate having two inputs connected to the outputs of the two pulse train generating means to produce a logical ZERO output in response to the identical coded pulse trains or a logical ONE output in response to pulse trains that are different; an electronic gate having a first input connected to the output of the second pulse generating means; a binary output counter having a clock input connected to the output of the electronic gate, and means for producing an output at a selected count; and means, connected between the output of the EXCLUSIVE-OR gate and a second input to the electronic gate, for keeping the electronic gate open for transmission of the second coded pulse train to the output counter when the two coded pulse trains are identical, and for closing the electronic gate to stop the counter from counting when the two coded pulse trains are different.

In the embodiment disclosed as an example, the electronic gate is a first NAND gate, the means for opening and closing this NAND gate comprises: a second NAND gate having a first input connected to the output of the EXCLUSIVE-OR gate; and a toggle flip-flop having a toggle input connected to the output of the second NAND gate, an output connected to a second input to the second NAND gate, and means for initially producing a logical ONE output therefrom. In the example, the key includes a power supply and an oscillator or clock for generating a uniform pulse train, and each coded pulse train generating means comprises an N-stage binary counter connected to the clock and to an N-stage multiplexer having $2^N$ control lines to which a given binary code is applied, where N is an integer greater than 1. The two coded pulse train generating means are as nearly identical as possible, to permit "opening" of the lock and production of the output signal, without closure of the NAND gates.

If any other key, having a different pulse frequency or pulse shape, is connected to the lock, the EXCLUSIVE-OR gate output changes to a logical ONE, which toggles the flip-flop to a ZERO output, which closes the NAND gates and prevents transmission of the pulses to the output counter.

Preferably, the clock for generating the uniform pulse train and the power source are parts of the key, to make it more difficult to open the lock. The flip-flop may be either a single flip-flop or the last flip-flop of a binary counter.

DETAILED DESCRIPTION OF PREFERRED EMBODIMENTS

Figure 1:
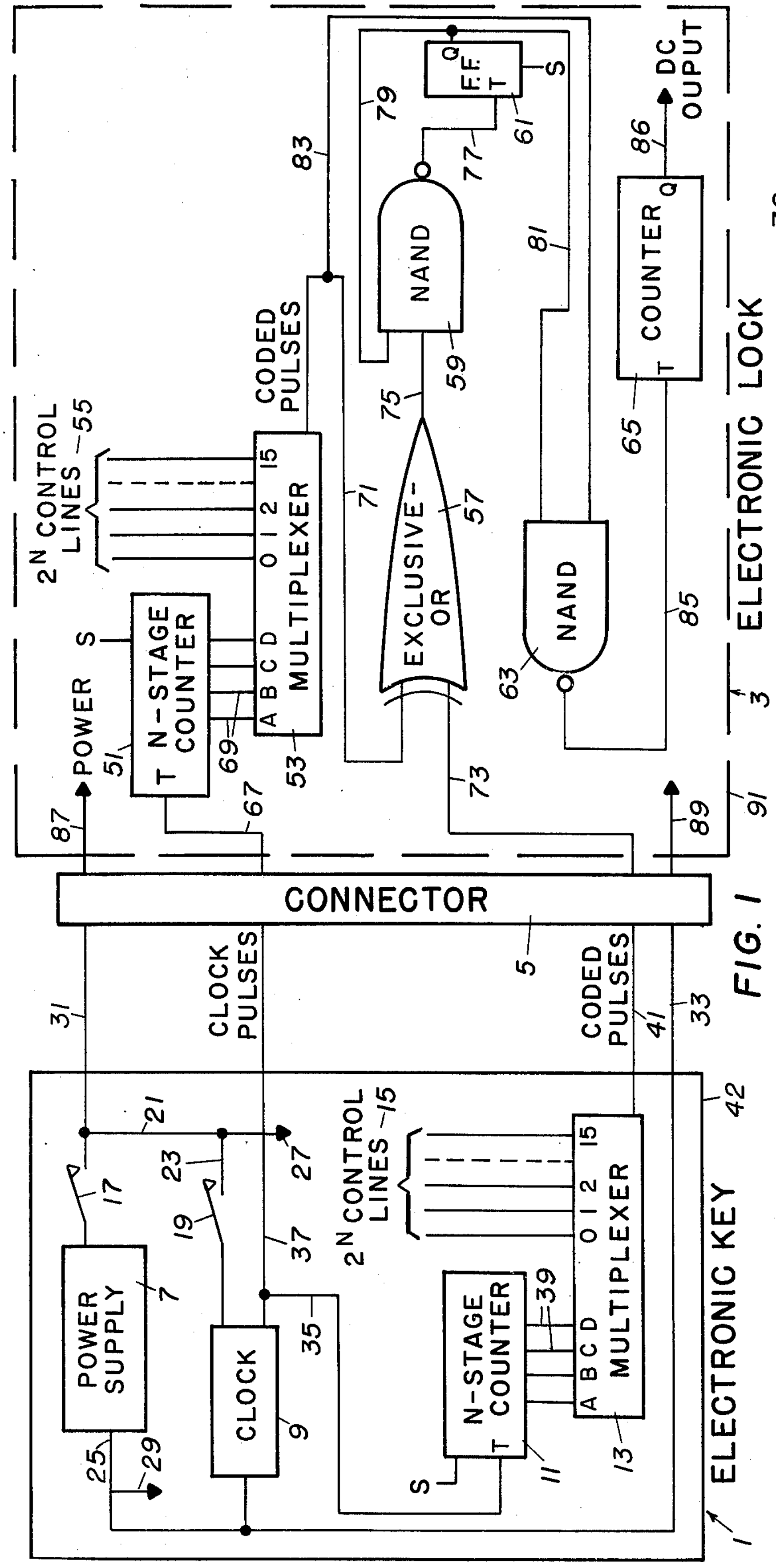
FIG. 1 is a circuit diagram schematically illustrating one embodiment of the invention.

FIG. 1 shows an electronic key 1 and an electronic lock 3, connected by a connector 5. The electronic key 1 comprises a power supply 7, a clock or generator 9 for generating a train of uniform square-wave pulses, an N-stage binary counter 11, and an N-stage multiplexer 13 having $2^N$ control lines 15, where N is an integer greater than 1. The power supply 7 is connected, by switches 17 and 19 and conductors 21, 23 and 25, to the clock 9. The power supply is also connected to the other elements of the key, by conductors schematically indicated by the arrows 27 and 29 and to connector 5, by conductors 31 and 33. The clock output is connected to the clock input T of the counter 11, by conductor 35, and to connector 5, by conductor 37. The N counting output terminals of counter 11 are connected, respectively, to the N input channels of the multiplexer 13 by conductors 39. The single output of multiplexer 13 is connected to connector 5, by a conductor 41. The elements of the key 1 may be enclosed in any suitable container 42. For example, N may be 4, in which case the counter 11 counts from 0 to 15, and the multiplexer 13 has four input channels A, B, C and D and 16 control lines 15 numbered from 0 to 15.

Figure 2:
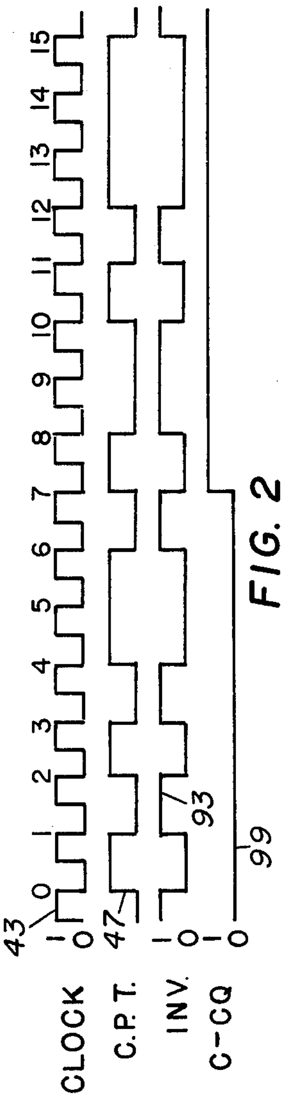
FIG. 2 is a set of waveforms including the clock pulse train and the coded pulse train used in the invention.

As is well known in the art, a 16-digit binary code applied to the 16 control lines 15 produces a pulse code modulation of the uniform input pulse train, to produce a coded output pulse train in which successive pulses conform to the applied binary code. The following chart is a sample Truth Table for a 4-stage multiplexer, such as the SN54150 Multiplexer manufactured by Texas Instruments, Inc., addressed by a 4-stage binary counter and having 16 control lines to which the binary code for decimal number 29877, that is 0111010010110101, is applied, as an example. The multiplexer 13 codes each successive pulse from 0 through 15 with the corresponding digit of the binary code number, as shown in the right hand vertical column. FIG. 2 shows the uniform clock pulse train 43 from clock 9, and the coded pulse train 47 produced by the multiplexer 13, for the code selected as an example.

The electronic lock 3 comprises an N-stage binary counter 51, an N-stage multiplexer 53, having $2^N$ control lines 55, an EXCLUSIVE-OR gate 57, a first NAND gate 59, a toggle flip-flop 61, a second NAND gate 63, and an output counter 65. The clock input T of counter 51 is connected, by a conductor 67, connector 5 and conductor 37, to the output of clock 9. The N counting output terminals of counter 51 are connected, respectively, to the N input channels (e.g., A, B, C and D) of multiplexer 53, by conductors 69. The two counters 11 and 51 and the two multiplexers 13 and 53 of the key and lock are as near identical as possible, and the same binary code is applied to the control lines 15 and 55, so that the two coded pulse trains produced thereby will be identical. The EXCLUSIVE-OR gate 57 has two inputs connected, respectively, to the two outputs of the multiplexers 13 and 53, by conductors 71 and 73, connector 5 and conductor 39. The first NAND gate 59 has one of two inputs connected by a conductor 75 to the output of EXCLUSIVE-OR gate 57, and an output connected by a conductor 77 to the clock input T of flip-flop 61. The output of flip-flop 61 is connected by a conductor 79 to the other input of gate 59, and also connected by a conductor 81 to one of two inputs to the second NAND gate 63, the other input being connected by a conductor 83 to the output of clock multiplexer 53. The output of gate 63 is connected by conductor 85 to the clock input T of output counter 65. The electrical output 86 of the lock 3 may be taken at any selected count of the counter 65. The power supply 7 is connected to the various elements of the lock, by means schematically indicated by the arrows 87 and 89 connected by connector 5 to conductors 31 and 33. The security area in which the lock is located is indicated by the dashed rectangle 91.

count, e.g. 0 to 7 for a 3-stage counter. Preferably, a count of at least 3 should be selected, to provide sufficient time for rejection of an alien key code.

The initial ONE output from the flip-flop 61 is also applied by conductor 79 as a ONE input to the first NAND gate 59. Following the application of power, the switch 19 is closed to transmit clock pulses to both of counters 11 and 51 and thereby produce two coded pulse trains from the multiplexers 13 and 53. If these two coded pulse trains are identical, the output of EXCLUSIVE-OR gate 57 will be a logical ZERO at all times, which when applied to the NAND gate 59, with the ONE from conductor 79, will produce a ONE input to the flip-flop 61. Since this does not toggle the flip-flop, the output thereof will remain a ONE, permitting transmission of pulses from the lock multiplexer 53 to the output counter 65.

However, if at any time the key pulse input to the EXCLUSIVE-OR gate should be, or become, different from the lock pulse input, as by an unauthorized attempt to open the lock with a different key, the output from that gate would become a ONE, which, with the other ONE input, would change the output of NAND gate 59 to a ZERO. This ZERO would toggle the flip-flop 61, changing its output to a zero, which would disable the first NAND gate 59 and also prevent the second NAND gate 63 from trnsmitting any pulses to the output counter 65. The new input to counter 65 would be a constant ONE, which would not actuate the counter. The disabling of the first NAND gate 59 would prevent toggling of the flip-flop 61 by a subsequent match of the two coded pulse trains.

The pulses transmitted by the second NAND gate 63

SAMPLE MULTIPLEXER TRUTH TABLE

| Pulse Number | Address D | Address C | Address B | Address A | Control Lines 15 | 14 | 13 | 12 | 11 | 10 | 9 | 8 | 7 | 6 | 5 | 4 | 3 | 2 | 1 | 0 | Coded Output Pulses |
|---|---|---|---|---|---|---|---|---|---|---|---|---|---|---|---|---|---|---|---|---|---|
| Input Code | | | | | 0 | 1 | 1 | 1 | 0 | 1 | 0 | 0 | 1 | 0 | 1 | 1 | 0 | 1 | 0 | 1 | |
| 0 | 0 | 0 | 0 | 0 | x | x | x | x | x | x | x | x | x | x | x | x | x | x | x | 1 | 1 |
| 1 | 0 | 0 | 0 | 1 | x | x | x | x | x | x | x | x | x | x | x | x | x | x | 0 | x | 0 |
| 2 | 0 | 0 | 1 | 0 | x | x | x | x | x | x | x | x | x | x | x | x | x | 1 | x | x | 1 |
| 3 | 0 | 0 | 1 | 1 | x | x | x | x | x | x | x | x | x | x | x | x | 0 | x | x | x | 0 |
| 4 | 0 | 1 | 0 | 0 | x | x | x | x | x | x | x | x | x | x | x | 1 | x | x | x | x | 1 |
| 5 | 0 | 1 | 0 | 1 | x | x | x | x | x | x | x | x | x | x | 1 | x | x | x | x | x | 1 |
| 6 | 0 | 1 | 1 | 0 | x | x | x | x | x | x | x | x | x | 0 | x | x | x | x | x | x | 0 |
| 7 | 0 | 1 | 1 | 1 | x | x | x | x | x | x | x | x | 1 | x | x | x | x | x | x | x | 1 |
| 8 | 1 | 0 | 0 | 0 | x | x | x | x | x | x | x | 0 | x | x | x | x | x | x | x | x | 0 |
| 9 | 1 | 0 | 0 | 1 | x | x | x | x | x | x | 0 | x | x | x | x | x | x | x | x | x | 0 |
| 10 | 1 | 0 | 1 | 0 | x | x | x | x | x | 1 | x | x | x | x | x | x | x | x | x | x | 1 |
| 11 | 1 | 0 | 1 | 1 | x | x | x | x | 0 | x | x | x | x | x | x | x | x | x | x | x | 0 |
| 12 | 1 | 1 | 0 | 0 | x | x | x | 1 | x | x | x | x | x | x | x | x | x | x | x | x | 1 |
| 13 | 1 | 1 | 0 | 1 | x | x | 1 | x | x | x | x | x | x | x | x | x | x | x | x | x | 1 |
| 14 | 1 | 1 | 1 | 0 | x | 1 | x | x | x | x | x | x | x | x | x | x | x | x | x | x | 1 |
| 15 | 1 | 1 | 1 | 1 | 0 | x | x | x | x | x | x | x | x | x | x | x | x | x | x | x | 0 |

In the normal operation of the lock and key, the portable electronic key 1 is first connected to the electronic lock 3 through the connector 5, which may be a part of either the key or the lock. At some time prior to energization, the flip-flop 61 is SET, by a known means S, to make its output go to a logical ONE when energized. Also, the two counters 11 and 51 are SET to produce identical outputs from the two multiplexers 13 and 53 at all times, that is, both ONE or both ZERO. The key 1 and lock 3 are then energized by the power supply 7, by closing switch 17, while keeping switch 19 open (clock off). The output of flip-flop 61 goes to logical ONE, enabling the second NAND gate 63, thus permitting that gate to transmit pulses, when generated, from the lock multiplexer 53 to output counter 65. Counter 65 would start counting and, if not interrupted, would eventually produce a ONE output signal at the selected are inverted thereby, as shown by pulse train 93 in FIG. 2. Square wave 99 is the Q counting pulse train at the C counting output of counter 65 produced by inverted input coded pulse train 93. The output of the lock circuit may be taken from the Q output terminal of this C output, which is logical ZERO up to the beginning of the fourth code pulse (in clock pulse number 7, which is the eighth clock pulse) for the code used. In the example given, the output can be taken from counts 0 through 5, that is, six counts. Thus, counter 65 may be only a 3-stage counter.

Figure 3:
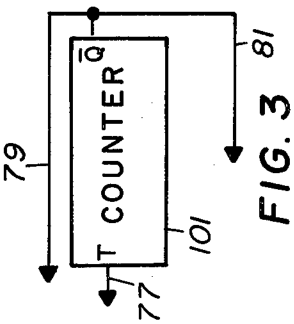
FIG. 3 is a fragmentary circuit diagram showing a modification of the circuit of FIG. 1.

The flip-flop 61 in FIG. 1 is, in effect, a one-count binary counter which disables the NAND gate 63 at the first occurrence of a mistake in attempting to open the lock, that is, the first mismatch between the two coded pulse trains fed to the EXCLUSIVE-OR gate 57. If it is desired to permit more than one such mistake before disabling the NAND gate 63, an N-stage binary counter 101 may be substituted for the flip-flop 61, as shown in FIG. 3. In this modification, the output is taken from counter 101 at any selected count. In order to maintain a ONE output up to the selected count, this output may be taken from the $\overline{Q}$ output, instead of the usual Q output. At the selected count, the $\overline{Q}$ output becomes ZERO, which disables both NAND gate 59 and 63 and stops counter 65. This $\overline{Q}$ output would be similar to an inversion of one of the pulse trains 95, 97 and 99 in FIG. 2. Counter 101 may also be a 3-stage counter.

If an unauthorized person who has no access to the correct portable electronic key attempts to "open" the electronic lock, he will encounter the following difficulties:

(1) He must know the correct supply voltage for the lock, and what terminal to apply it to on the connector; he must know which is the ground pin; he must known that a clock input is necessary, and what connector terminal to use; he must know the correct code, and what connector terminal to use; and (2) Even if the unauthorized person obtains knowledge of the correct supply voltage, terminal and clock frequency, he must still determine the correct code. The number of codes possible is $2^M$, where M is the number of control lines 15 and 55. For 16 lines, the number of codes possible is $2^{16}$, or 65,536.

To make is still more difficult for an unauthorized person to open the lock, a delay line or a frequency divider may be incorporated in each of the keys and the lock.

We claim:

1. In a security system including an electronic lock, an electronic key and means for connecting said key to said lock; said electronic lock comprising:

means for generating a first coded pulse train pulse modulated in accordance with a given binary code;

an EXCLUSIVE - OR gate having two inputs and one output, one input connected to the output of said coded pulse train generating means, and the other input having a terminal for receiving from said key a second coded pulse train, to produce a logical ZERO output from said gate when the two coded pulse trains are identical and a logical ONE output when the two coded pulse trains are different;

an electronic gate having two inputs and one output, one input connected to the output of said coded pulse train generating means;

a binary output counter having at least two counting stages, a clock input connected to the output of said electronic gate, and means for producing an output signal at a selected count; and means, connected between the output of said EXCLUSIVE-OR gate and the other input of said electronic gate, for keeping said electronic gate open for the transmission of coded pulses to said output counter while said two coded pulse trains are identical, thus permitting said counter to count coded pulses from said coded pulse train generating means, and for permanently closing said electronic gate when said two coded pulse trains are different, thus permanently stopping said counter.

2. An electronic lock as in claim 1, wherein the last-named means includes:

a NAND gate having two inputs and one output, one of said inputs connected to said EXCLUSIVE-OR gate output; and a negative-toggling flip-flop having a clock input connected to the output of said NAND gate, an output connected to said other input of said electronic gate and also connected to the other input of said NAND gate, and means for initially producing a logical ONE output;

whereby a ONE output from said EXCLUSIVE-OR gate, inverted to a ZERO by said NAND gate, causes said flip-flop to toggle, changing its output froma ONE to a ZERO, which closes said electronic and NAND gates, thereby preventing further toggling of said flip-flop and stopping said output counter.

3. An electronic gate as in claim 2 wherein said electronic gate is a NAND gate.

4. An electronic lock as in claim 2 wherein said flip-flop is the last flip-flop in a binary counter having at least two counting stages.

5. An electronic lock as in claim 1, wherein said coded pulse train generating means comprises:

a binary counter having a clock input and N flip-flops with N output terminals, where N is an integer greater than 1; and a multiplexer having N input channels connected, respectively, to said counter output terminals, and $2^N$ digital control lines to which said given binary code is applied.

6. An electronic lock as in claim 5, wherein $N = 4$, and hence, each of the last named binary counters has four flip-flops and counts from 0 through 15, and each of said multiplexers has four input channels, 16 digital control lines, one for each count, and one output channel.

7. A security system including an electronic key, an electronic lock, means for connecting said key to said lock, clock means in one of said key and lock for generating a train of uniform pulses of given frequency, and a power supply carried by at least one of said key and lock for energizing said system;

said key comprising first means coupled to said clock means for pulse code modulating said uniform pulse train to produce a first coded pulse train modulated in accordance with a given binary code;

said lock comprising:

second means coupled to said clock means for pulse code modulating said uniform pulse train to produce a second coded pulse train identical with said first coded pulse train;

an EXCLUSIVE-OR gate having two inputs connected, respectively, to the outputs of said first and second modulating means to produce a logical ZERO output in response to identical coded pulse trains;

a first NAND gate having two inputs, one input being connected to the output of said EXCLUSIVE-OR gate;

a toggle flip-flop having a clock input connected to the output of said first NAND gate, an output connected to the other input of said first NAND gate, and means for initially producing a logical ONE output;

a second NAND gate having two inputs, one connected to the output of said flip-flop, and the other connected to the output of said second modulating means; and a binary output counter having at least two counting stages, a clock input connected to the output of said second NAND gate, and means for producing an output signal at a selected count.

8. A security system as in claim 7, wherein said flip-flop is the last flip-flop of a binary counter having at least two counting stages.

9. A security system as in claim 7, wherein said clock means and said power supply are carried by said key, and each is provided with an on-off output switch.

10. A security system as in claim 7, wherein each of said first and second pulse code modulating means comprises:

a binary counter having its clock input connected to said clock means and having N flip-flops with N output terminals, where N is an integer greater than 1; and a multiplexer having N input channels connected, respectively, to said counter output terminals, and $2^N$ digital control lines to which said given binary code is applied.

11. A security system as in claim 10, wherein the last-named counters include means to SET them for identical outputs at the start of counting.

12. A security system as in claim 10, wherein $N = 4$; and hence, each of the last-named binary counters has four flip-flops and counts from 0 through 15, and each multiplexer has four input channels, 16 digital control lines, one for each count, and one output channel.

* * * * *